(12) United States Patent
Shinohara et al.

(10) Patent No.: US 6,295,435 B1
(45) Date of Patent: Sep. 25, 2001

(54) IMAGE FORMING APPARATUS WHICH CORRECTS DEVIATIONS BETWEEN IMAGES OF DIFFERENT COLORS

(75) Inventors: Tadashi Shinohara; Kiyoshi Ohshima, both of Kanagawa; Yasushi Nakazato, Tokyo; Mitsugu Sugiyama, Kanagawa, all of (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/570,174

(22) Filed: May 12, 2000

(30) Foreign Application Priority Data

May 14, 1999 (JP) .................................................. 11-133706

(51) Int. Cl.[7] .................................................. G03G 15/01
(52) U.S. Cl. ...................... 399/301; 250/559.44; 347/116
(58) Field of Search ............................ 399/301; 347/116; 358/526; 250/559.44; 101/181; 399/299

(56) References Cited

U.S. PATENT DOCUMENTS

| 5,172,180 | 12/1992 | Ohshima et al. . |
| 5,245,396 | 9/1993 | Ohshima et al. . |
| 5,315,323 | 5/1994 | Ohshima et al. . |
| 5,457,518 | * 10/1995 | Ashikaga et al. ................. 347/116 X |
| 5,737,665 | 4/1998 | Sugiyama et al. . |
| 5,765,083 | 6/1998 | Shinohara . |
| 5,875,380 | 2/1999 | Iwata et al. . |

* cited by examiner

Primary Examiner—Joan Pendegrass
(74) Attorney, Agent, or Firm—Oblon, Spivak, McClelland, Maier & Neustadt, P.C.

(57) ABSTRACT

An image forming apparatus, particularly a color image forming apparatus, of the present invention distinguishes a register mark and the background of a conveying member on the basis of the level of a signal representative of the background and the peak value or the bottom value of the signal. The apparatus can therefore accurately detect deviation between images of different colors and correct it.

18 Claims, 18 Drawing Sheets

IMAGE FORMING APPARATUS WHICH CORRECTS DEVIATIONS BETWEEN IMAGES OF DIFFERENT COLORS

BACKGROUND OF THE INVENTION

The present invention relates to an electrophotographic image forming apparatus and more particularly to a color image forming apparatus capable of accurately detecting positional deviation between images of different colors and correcting the deviation.

The prerequisite with a tandem image forming apparatus extensively used today is that images of different colors be brought into accurate register. Positional deviation between images of different colors is ascribable to various causes including skew, deviation in the subscanning direction, irregular pitch in the subscanning direction, magnification error in the main scanning direction, and deviation in the main scanning direction. While various schemes have heretofore been proposed for obviating positional deviation, none of them can accurately detect deviation to a satisfactory degree.

SUMMARY OF THE INVENTION

It is therefore an object of the present invention to provide an image forming apparatus capable of accurately sensing positional deviation between images of different colors and correcting it.

It is another object of the present invention to provide an image forming apparatus capable of accurately sensing positional deviation between images of different colors, correcting the deviation, and executing accurate and rapid calculations for the correction.

It is still another object of the present invention to provide an image forming apparatus capable of easily determining whether or not the result of detection is correct, and reducing a period of time necessary for the decision.

It is a further object of the present invention to provide an image forming apparatus capable of preventing error processing from continuing over a long period of time and causing the operator to feel uneasy.

A color image forming apparatus of the present invention includes a conveying member for conveying a recording medium in a preselected direction. A plurality of image forming sections are arranged side by side along the conveying member each for forming a toner image of a particular color by an electrophotographic process. A plurality of image transfer units are respectively assigned to the image forming sections for sequentially transferring toner images to the recording medium one upon the other. A mark forming device causes the image forming sections to form respective register marks with toner and transfer the register marks to the recording medium. The register marks allow deviation of the toner images on the recording medium to be detected. A mark sensor senses the register marks. A correcting device corrects the deviation on the basis of a signal output from the mark sensor. A mark identifying device specifies a signal output from the mark sensor and representative of the background of the conveying member, and determines a point of the signal above a value $Vs+\alpha$ or $Vs-\alpha$, where $Vs$ denotes a signal level representative of the background while $\alpha$ denotes a preselected value, and having a peak or a bottom value within a preselected section to be the point where a part of the register marks has been sensed.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
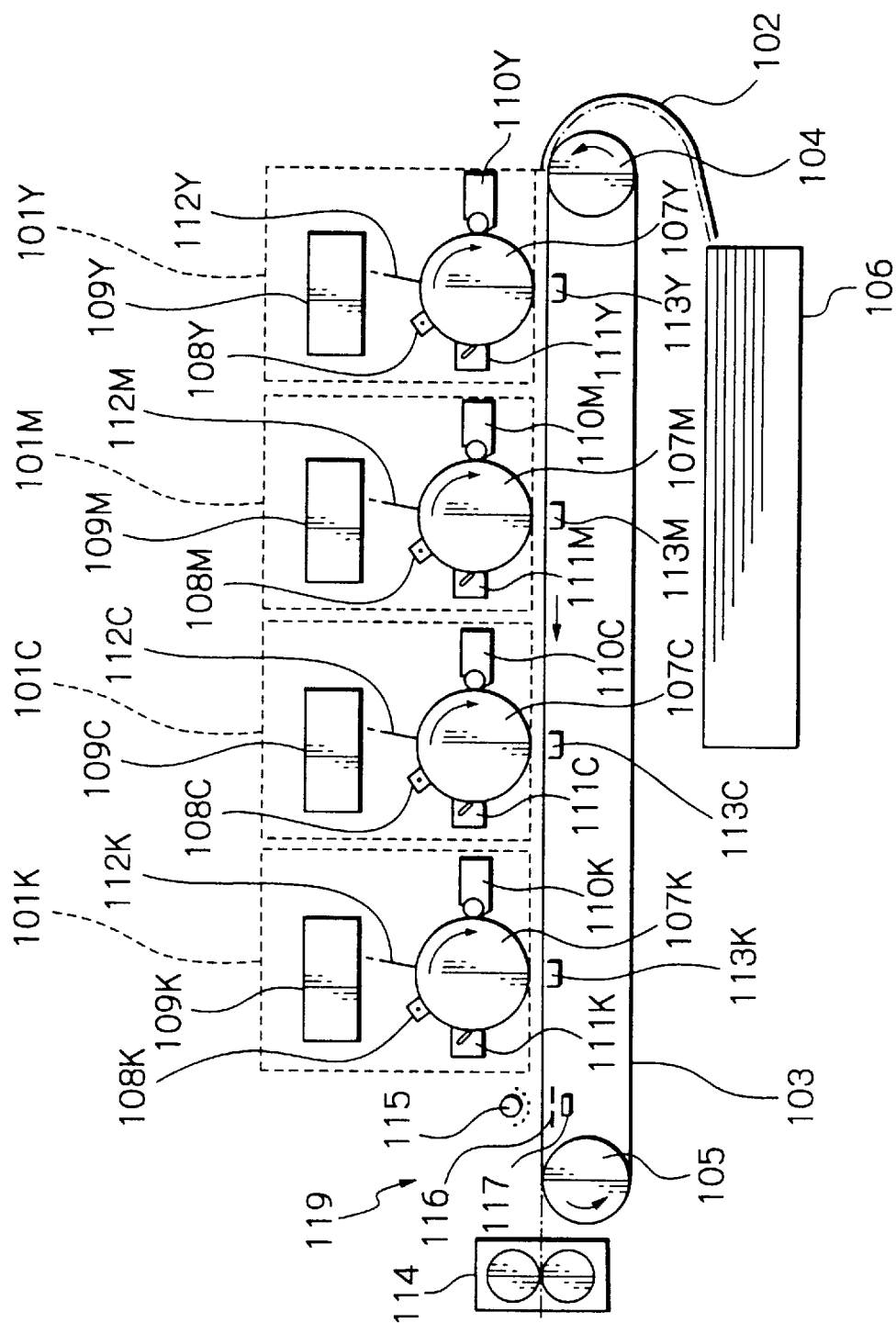
FIG. 1 is a view showing a conventional tandem color image forming apparatus.

To better understand the present invention, reference will be made to a conventional tandem color image forming apparatus, shown in FIG. 1. As shown, the image forming apparatus includes a belt 103 for conveying a paper sheet or similar recording medium 102. Image forming sections 101Y (yellow), 101M (magenta), 101C (cyan) and 101K (black) are arranged side by side along the belt 103 for forming a yellow, a magenta, a cyan and a black toner image, respectively. The belt 103 is passed over two rollers 104 and 105 one of which is a drive roller and the other of which is a driven roller. The rollers 104 and 105 are rotated to cause the belt 103 to turn in a direction indicated by an arrow in FIG. 1. A tray 106 loaded with a stack of paper sheets 102 is positioned below the belt 103. The paper sheet 102 on the top of the stack is fed from the tray 106 to the belt 103 and electrostatically retained on the belt 103. The belt 103 conveys the paper sheet 102 to the image forming section 101Y. The image forming section 101Y forms a yellow toner image on the paper sheet 102.

The image forming section 101Y includes a photoconductive drum 107Y. A charger 108Y, an exposing unit 109Y, a developing unit 110Y and a drum cleaner 111Y are arranged around the drum 107Y. The charger 108Y uniformly charges the surface of the drum 107Y to preselected polarity. The exposing unit 109Y exposes the charged surface of the drum 107Y with a laser beam 112Y in accordance with yellow image data, thereby forming a latent image on the drum 107Y. The developing unit 110Y develops the latent image to thereby form a yellow toner image on the drum 107Y. An image transfer unit 113Y transfers the yellow toner image to the paper sheet 102 at a position where the drum 107Y and the paper sheet 102 contact each other (image transfer position). After the image transfer, the drum cleaner 111Y removes toner left on the drum 107Y so as to prepare the drum 107Y for the next image forming cycle.

The image forming sections 101M, 101C and 101K, like the image forming section 101Y, respectively include photoconductive drums 107M, 107C and 107K, chargers 108M, 108C and 108K, exposing units 109M, 109C and 109K, developing units 110M, 110C and 110K, drum cleaners 111M, 111C and 111K, and image transfer units 113M, 113C and 113K. The exposing units 109M, 109C and 109K respectively form latent images on the drums 112M, 112C and 112K with laser beams 112M, 112C and 112K in accordance with magenta, cyan and black image data. The developing units 110M, 110C and 110K each develop the latent image formed on the respective drum 107M, 107C or 107K. As a result, magenta, a cyan and a black toner image are formed on the drums 107M, 107C and 107K, respectively.

When the belt 103 conveys the paper sheet 102 carrying the yellow toner image thereon to the image forming section 101M, the magenta toner image is transferred from the drum 107M to the paper sheet 102 upon the yellow toner image. While the belt 103 sequentially conveys the paper sheet 102 via the following image forming sections 101C and 101K, the cyan and black toner images are respectively transferred from the drums 107C and 107K to the paper sheet 102 in the same manner as the magenta toner image, completing a color image on the paper sheet 102. The paper sheet 102 with the color image is separated from the belt 103 and has the color image fixed by a fixing unit 114.

Figure 2:
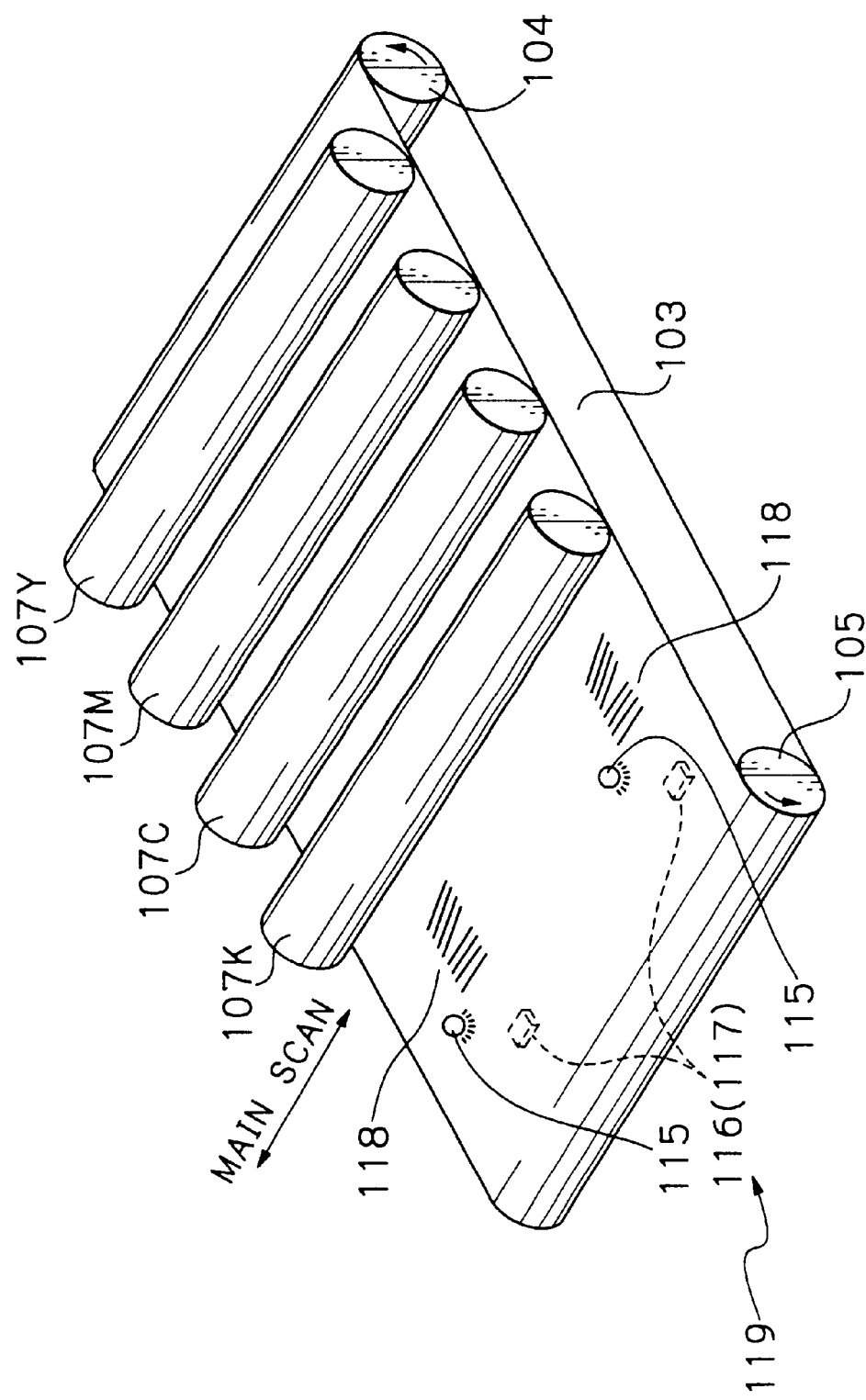
FIG. 2 is an isometric view showing sensors included in the apparatus of FIG. 1 together with members arranged therearound.
Figure 3:
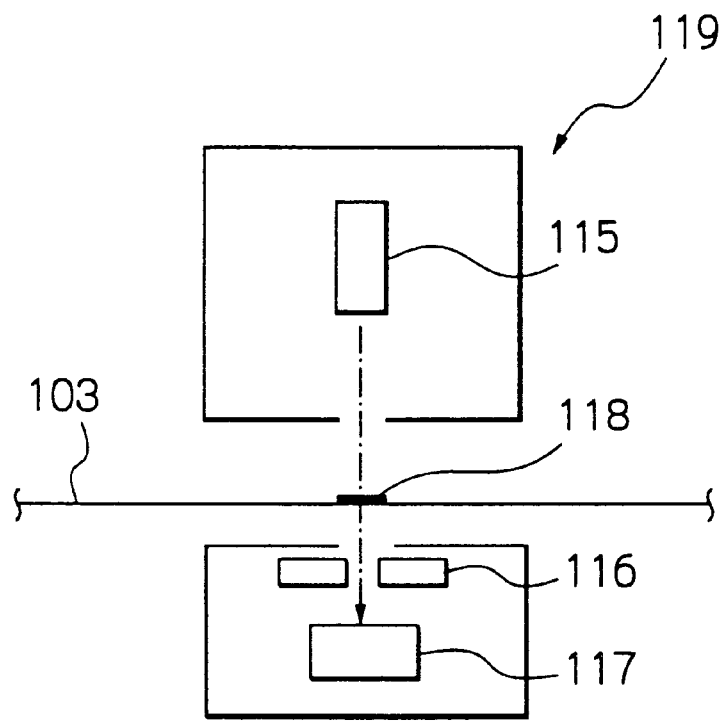
FIG. 3 is an enlarged front view of one of the sensors.
Figure 4:
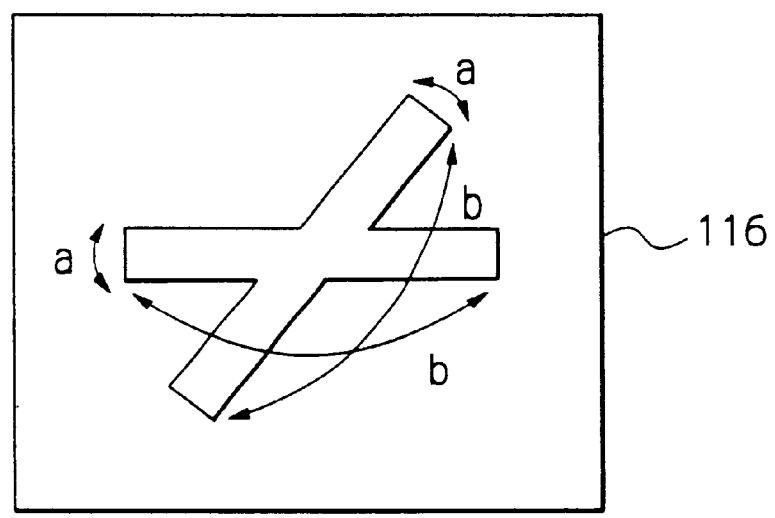
FIG. 4 is an enlarged plan view of a slit included in the sensor.

One of conventional schemes for obviating positional deviation between the toner images of different colors ascribable to the previously mentioned causes will be described hereinafter. As shown in FIG. 1, the image forming apparatus additionally includes a sensor 119 made up of a light emitting element 115, a slit 116, and a photosensitive element 117. More specifically, as shown in FIG. 2, two sensors 119 are positioned at opposite sides in the main scanning direction. The sensors 119 each sense a particular register mark 118 formed on the belt 103 in the form of a toner image. The register mark 118 is made up of horizontal lines parallel to the main scanning direction and oblique lines inclined relative to the horizontal lines. FIG. 3 shows one of the sensors 119 in an enlarged front view. As shown in FIG. 4, the slit 116 has a portion parallel to the horizontal lines of the register mark 118 and a portion parallel to the oblique lines of the same. These portions each have a width a and a length b. Amounts of deviation between the images of different colors and amounts of correction are determined on the basis of the outputs of the sensors 119.

Figure 5:
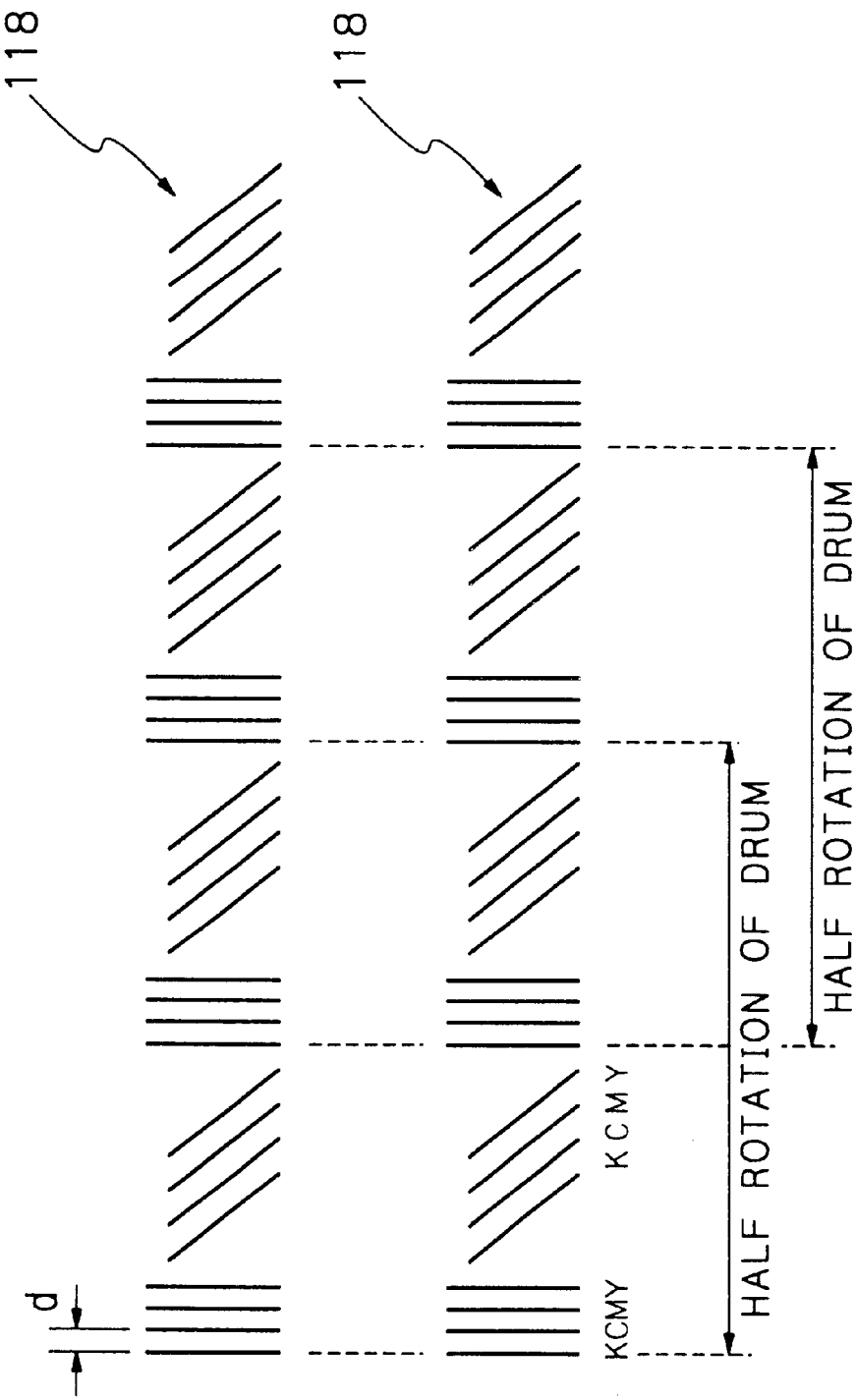
FIG. 5 is an enlarged view showing register marks formed by the apparatus of FIG. 1.

More specifically, as shown in FIG. 5, each register mark or toner mark 118 is made up of four horizontal lines K, C, M and Y and four oblique lines K, C, M and Y. The horizontal lines and oblique lines each have a width identical with the width a of each portion of the slit 116 and a length greater than the length b of the same. In FIG. 5, the K, C, M and Y lines are sequentially positioned in this order; four horizontal lines and four oblique lines are considered as a pair. A plurality of pairs of toner marks of the same color and shape are positioned at the intervals of one half of the circumferential length of each of the drums 107Y through 107K. The consecutive pairs of toner marks are located at a distance that is not an integral multiple of one half of the above circumferential length. One or more toner marks exist between nearby pairs of toner marks. In the specific configuration shown in FIG. 5, four pairs of toner marks are formed over a distance corresponding to the entire circumference of each of the drums 107Y through 107K.

Further, nearby lines are spaced from each other by a target distance d that prevents the order of the lines from being reversed even when positional deviation occurs. In this condition, when any one of the lines arrives at the corresponding portion of the slit 116, the sensor 119 outputs a signal having a sharp peak-like or bottom like waveform and allows the center of the line to be accurately detected. In each pair of toner marks, the times when the consecutive horizontal and oblique lines are sensed are compared with the K horizontal line serving as a reference. In addition, the right and left lines are compared with respect to the time when they are sensed. Subsequently, a mean value of the results of sensing derived from the four pairs of toner marks is produced in order to remove errors ascribable to the irregular rotation of the drums 107Y through 107K. This is successful to correct skew, deviation in the main and sub-scanning directions, and magnification error in the main scanning direction.

However, the problem with the above-described conventional scheme is that deviation between the images of different colors cannot be determined with sufficient accuracy unless signal representative of the register marks 118 and signals representative of the belt 103 are surely separated from each other.

Figure 6:
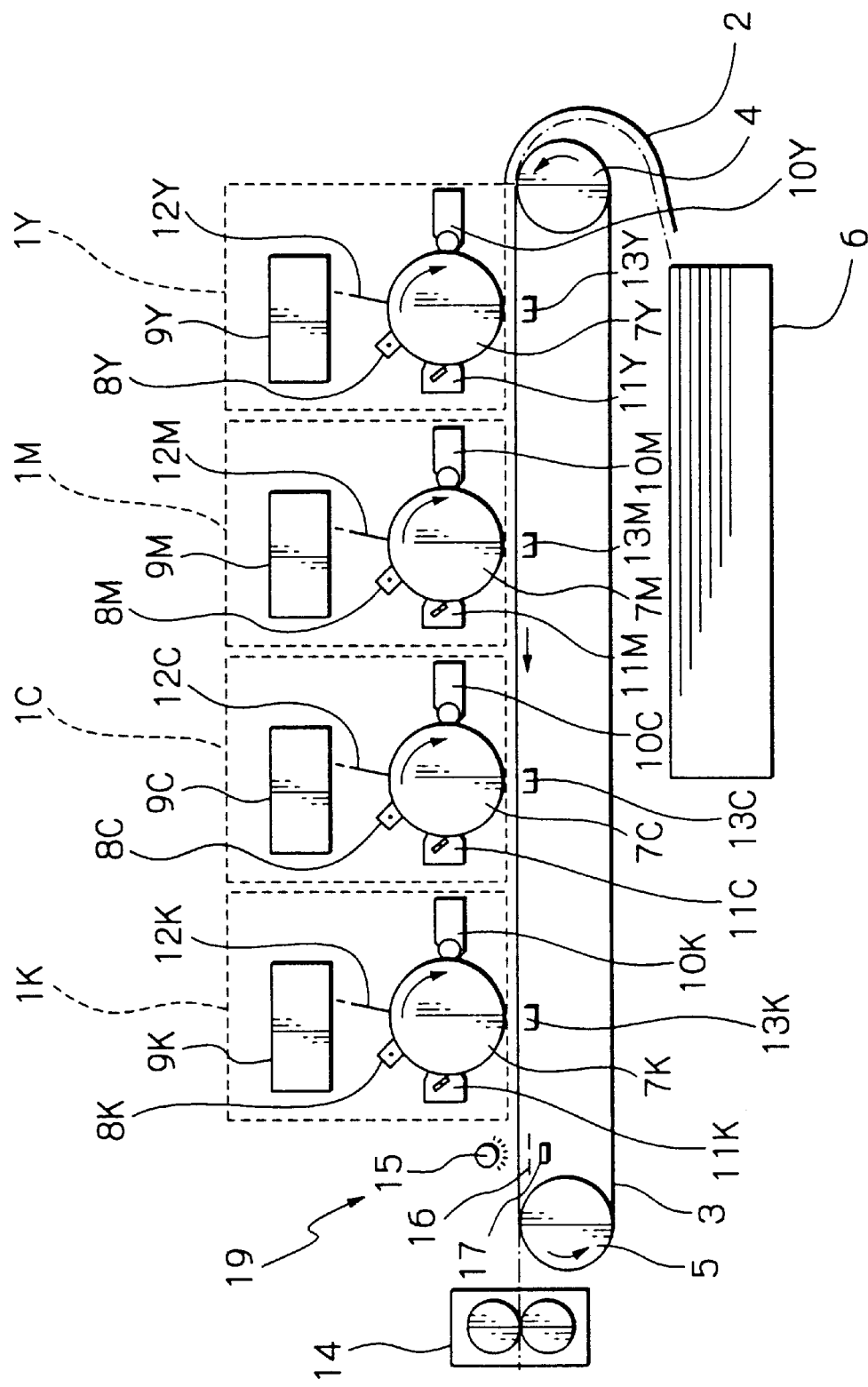
FIG. 6 is a view showing a tandem color image forming apparatus embodying the present invention.

Referring to FIG. 6, a tandem color image forming apparatus embodying the present invention will be described. As shown, the image forming apparatus includes a belt 3 for conveying a paper sheet or similar recording medium 2. Image forming sections 1Y, 1M, 1C and 1K are arranged side by side along the belt 3 for forming a yellow, a magenta, a cyan and a black toner image, respectively. The belt 3 is passed over two rollers 4 and 5 one of which is a drive roller and the other of which is a driven roller. The rollers 4 and 5 are rotated to cause the belt 3 to turn in a direction indicated by an arrow in FIG. 6. A tray 6 loaded with a stack of paper sheets 2 is positioned below the belt 3. The paper sheet 2 on the top of the stack is fed from the tray 6 to the belt 3 and electrostatically retained on the belt 3. The belt 3 conveys the paper sheet 2 to the image forming section 1Y. The image forming section 1Y forms a yellow toner image on the paper sheet 2.

The image forming section 1Y includes a photoconductive drum 7Y. A charger 8Y, an exposing unit 9Y, a developing unit 10Y and a drum cleaner 11Y are arranged around the drum 7Y. The charger 8Y uniformly charges the surface of the drum 7Y. The exposing unit 9Y exposes the charged surface of the drum 7Y with a laser beam 12Y in accordance with yellow image data, thereby forming a latent image on the drum 7Y. The developing unit 10Y develops the latent image to thereby form a yellow toner image on the drum 7Y. An image transfer unit 13Y transfers the yellow toner image to the paper sheet 2 at a position where the drum 7Y and the paper sheet 2 contact each other (image transfer position). After the image transfer, the drum cleaner 11Y removes toner left on the drum 7Y so as to prepare the drum 7Y for the next image forming cycle.

The image forming sections 1M, 1C and 1K, like the image forming section 1Y, respectively include photoconductive drums 7M, 7C and 7K, chargers 8M, 8C and 8K, exposing units 9M, 9C and 9K, developing units 10M, 10C and 10K, drum cleaners 11M, 11C and 11K, and image transfer units 13M, 13C and 13K. The exposing units 9M, 9C and 9K respectively form latent images on the drums 12M, 12C and 12K with laser beams 12M, 12C and 12K in accordance with magenta, cyan and black image data. The developing units 10M, 10C and 10K each develop the latent image formed on the respective drum 7M, 7C or 7K. As a result, a magenta, a cyan and a black toner image are formed on the drums 7M, 7C and 7K, respectively.

When the belt 3 conveys the paper sheet 2 carrying the yellow toner image thereon to the image forming section 1M, the magenta toner image is transferred from the drum 7M to the paper sheet 2 upon the yellow toner image. While the belt 3 sequentially conveys the paper sheet 2 via the following image forming sections 1C and 1K, the cyan and black toner images are respectively transferred from the drums 7C and 7K to the paper sheet 2 in the same manner as the magenta toner image, completing a color image on the paper sheet 2. The paper sheet 2 with the color image is separated from the belt 3 and has the color image fixed by a fixing unit 14.

Figure 7:
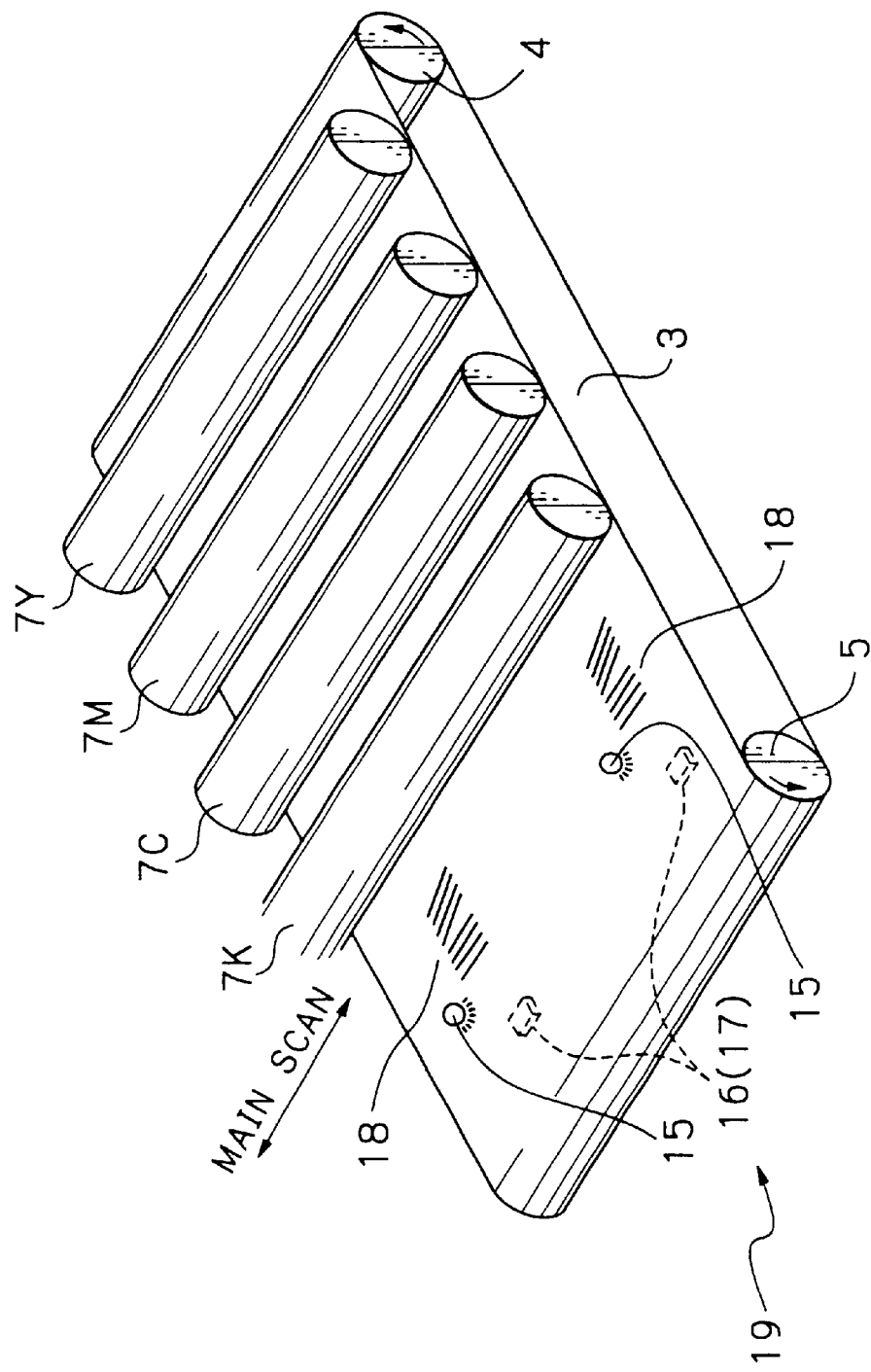
FIG. 7 is an isometric view showing sensors included in the illustrative embodiment together with members arranged therearound.
Figure 8:
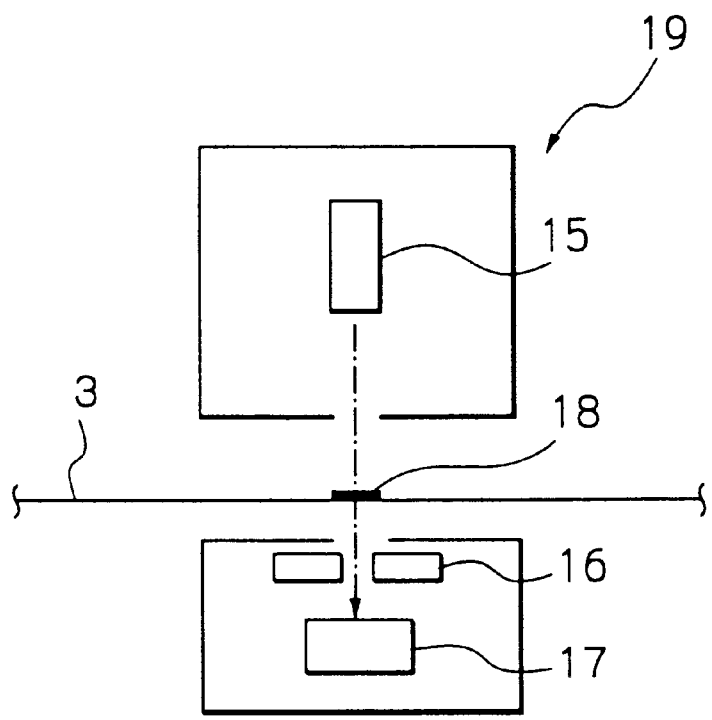
FIG. 8 is an enlarged front view of one of the sensors of the illustrative embodiment.
Figure 9:
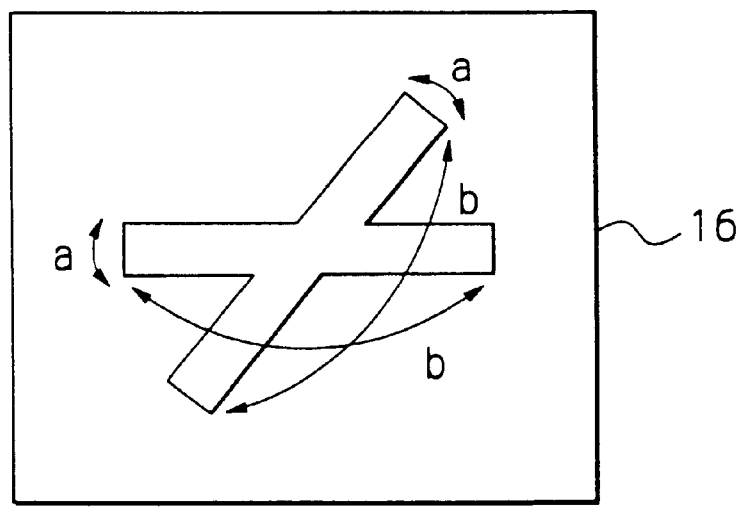
FIG. 9 is an enlarged plan view of a slit included in the sensor of FIG. 8.

As shown in FIG. 6, the image forming apparatus additionally includes a sensor 19 made up of a light emitting element 15, a slit 16, and a photosensitive element 17. More specifically, as shown in FIG. 7, two sensors 19 are positioned at opposite sides in the main scanning direction. The sensors 19 each sense a particular register mark 18 formed on the belt 103 in the form of a toner image (implementing mark forming means). The register mark 18 is made up of horizontal lines parallel to the main scanning direction and oblique lines inclined relative to the horizontal lines. FIG. 8 shows one of the sensors 119 in an enlarged front view. As shown in FIG. 9, the slit 16 has a portion parallel to the horizontal lines of the register mark 18 and a portion parallel to the oblique lines of the same. These portions each have a width a and a length b.

Figure 10:
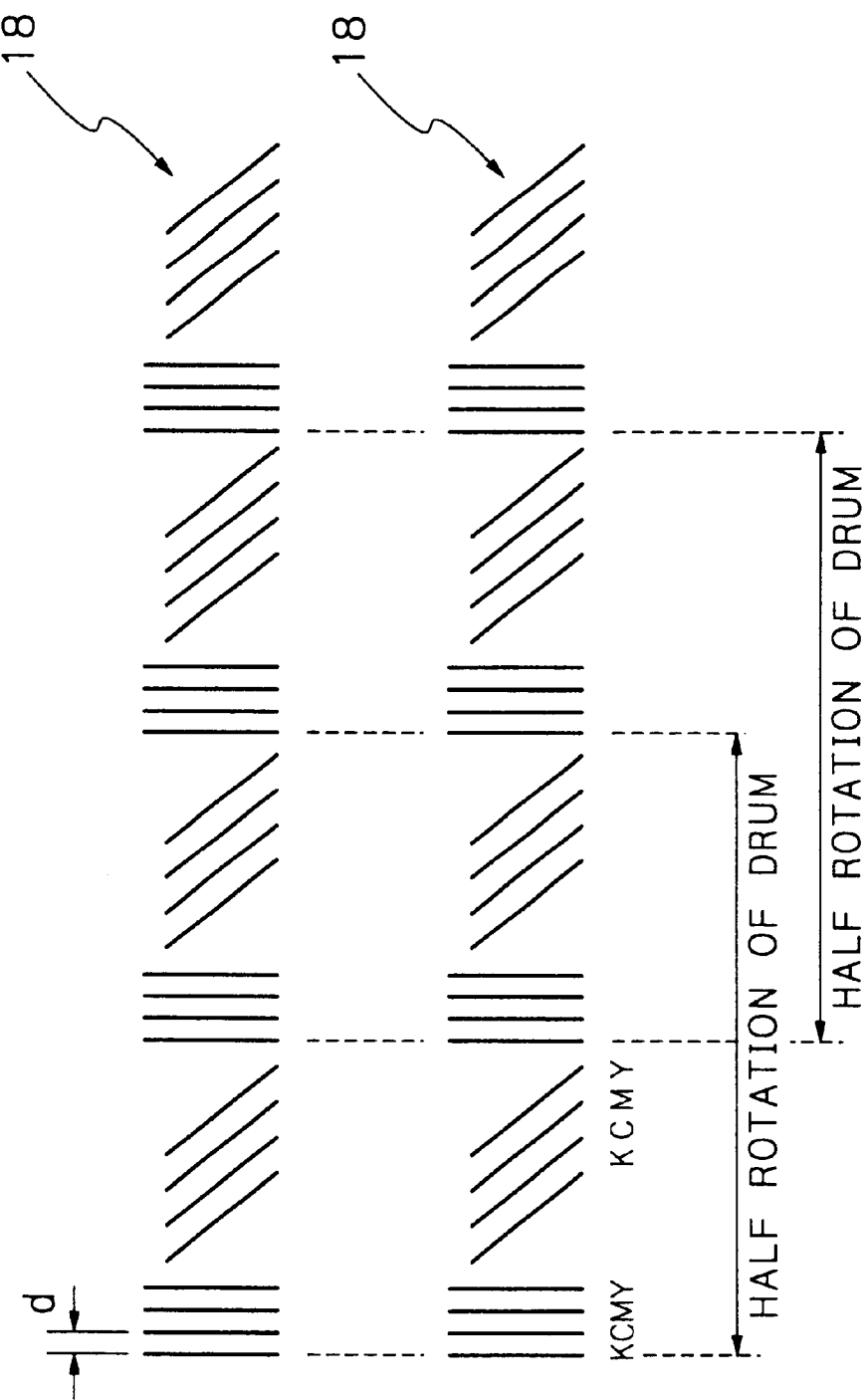
FIG. 10 is an enlarged view showing register marks formed by the illustrative embodiment.

More specifically, as shown in FIG. 10, each register mark 18 is made up of four horizontal lines K, C, M and Y and four oblique lines K, C, M and Y. The horizontal lines and oblique lines each have a width identical with the width a of each portion of the slit 16 and a length greater than the length b of the same. In the illustrative embodiment, the K, C, M and Y lines are sequentially positioned in this order; four horizontal lines and four oblique lines considered as a pair. A plurality of pairs of toner marks of the same color and shape are positioned at the intervals of one half of the circumferential length of each of the drums 7Y through 7K. The pairs of toner marks are located at a distance that is not an integral multiple of one half of the above circumferential length. One or more toner marks exist between nearby pairs of toner marks. In the illustrative embodiment, four pairs of toner marks are formed over a distance corresponding to the entire circumference of each of the drums 7Y through 7K.

Further, in each pair of toner marks, nearby lines are spaced from each other by a target distance that prevents the order of the lines from being reversed even when positional deviation occurs.

Figure 11:
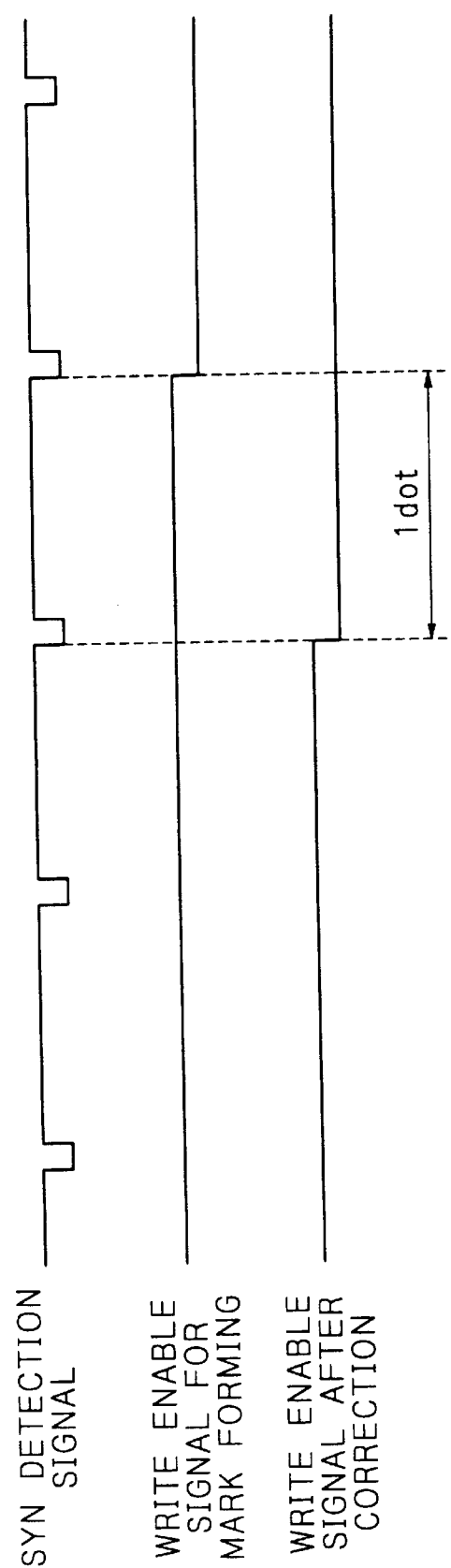
FIG. 11 is a timing chart demonstrating a specific procedure in which the illustrative embodiment corrects a write start timing in the subscanning direction.

How correction is executed on the basis of the various kinds of deviation sensed and calculated will be described hereinafter. FIG. 11 is a timing chart demonstrating specific correction of a write start timing in the subscanning direction. Resolution for correction is assumed to be a single dot. As shown, a write enable signal or image area signal for causing any one of the exposing units 9Y through 9K to start writing a latent image is adjusted in accordance with the timing of a synchronization detection signal. For example, assume that the result of mark sensing and calculation indicates that the timing for starting writing an image should be advanced in the subscanning direction by a single dot. Then, the write enable signal should only be made active earlier by a single synchronization detection signal. Such a procedure implements correcting means.

Figure 12:
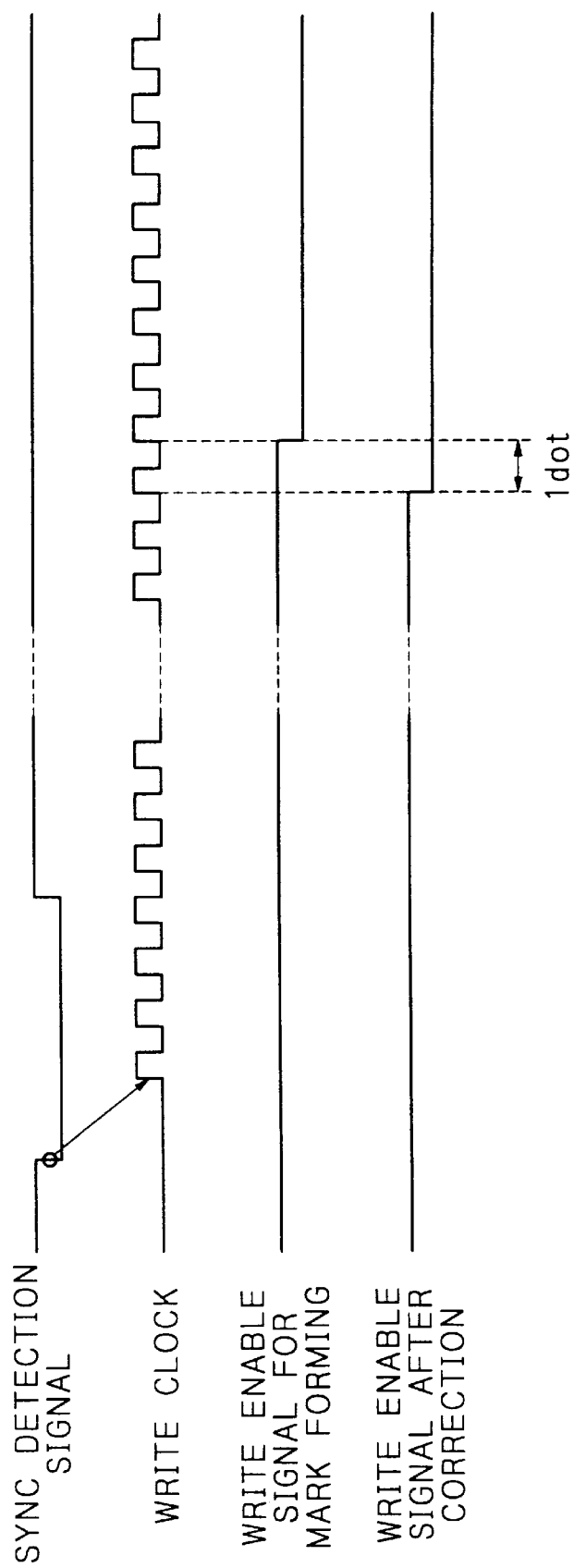
FIG. 12 is a timing chart demonstrating a specific procedure in which the illustrative embodiment corrects a write start timing in the main direction.

FIG. 12 is a timing chart demonstrating specific correction of a write start timing in the main scanning direction. Again, resolution for correction is assumed to be a single dot. As shown, a write clock is accurately matched in phase throughout the lines by the negative-going edge of the synchronization detection signal. While an image begins to be written in synchronism with the write clock, a write enable signal in the main scanning direction is also generated in synchronism with the write clock. Assume that the result of mark sensing and calculation indicates that the timing for starting writing an image should be advanced in the main direction by a single dot. Then, the write enable signal should only be made active earlier by a single clock, as shown in FIG. 12. Further, assume that the above result indicates that a magnification in the main scanning direction is deviated from the reference color. Then, the magnification may be varied by use of a clock generator or similar device capable of varying frequency in extremely small steps. This implements correcting means.

Figure 13:
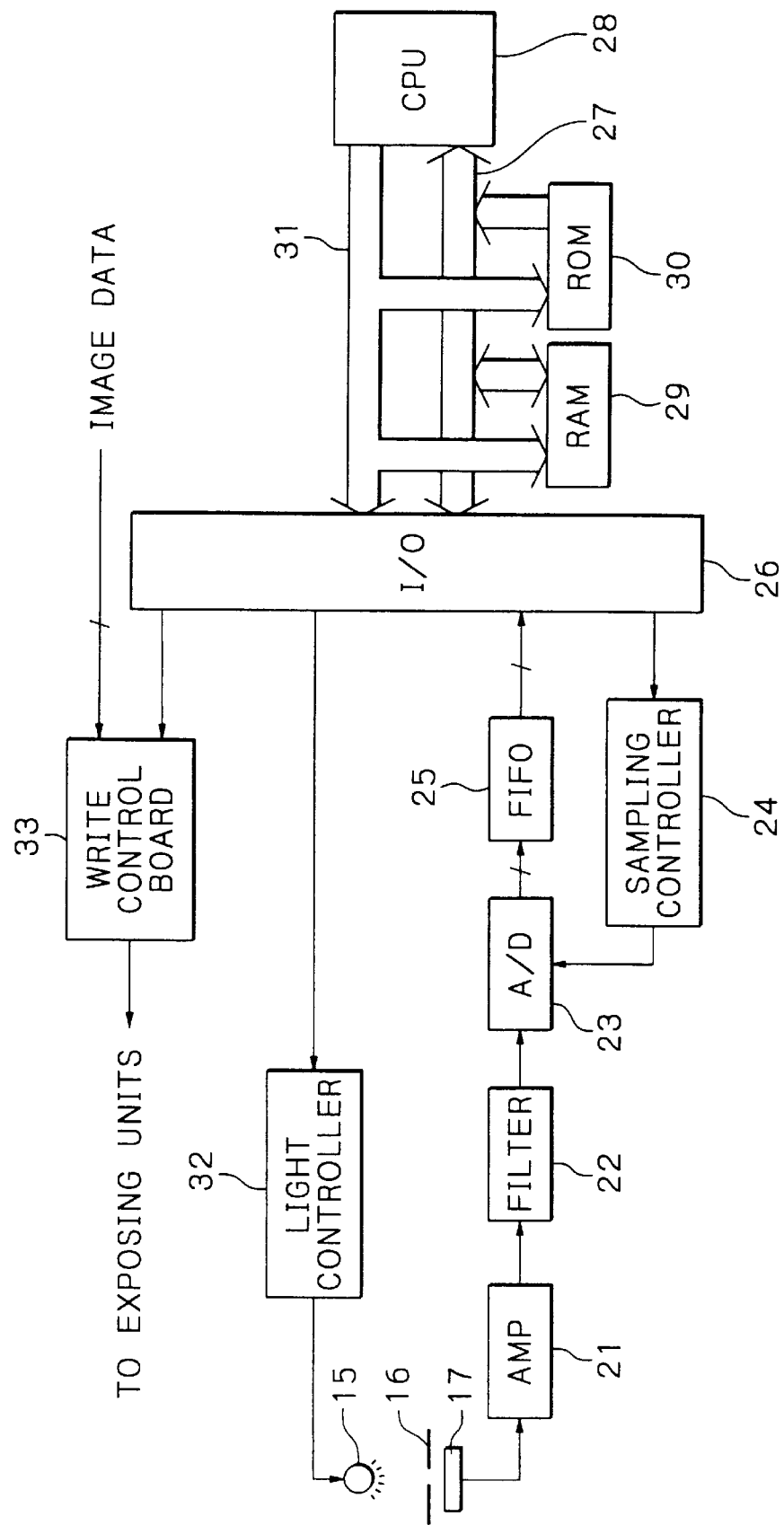
FIG. 13 is a block diagram schematically showing circuitry for processing data output from one of the sensors.

FIG. 13 shows circuitry for processing data sensed by each sensor 19. As shown, a signal output from the photosensitive element 17 is input to an amplifier (AMP) 21 and amplified thereby. A filter 22 passes only signal components representative of the lines. An analog-to-digital converter (A/D) 23 converts the above signal components or analog data to digital data. At this instant, a sampling controller 24 controls the sampling of the data. The sampled data are written to a FIFO (First-In First-Out) memory 25. While the circuitry of FIG. 13 is assigned to one sensor 19, another, but identical, circuitry is assigned to the other sensor 19.

After all the register marks 18 have been sensed once, the data written to the FIFO memory 25 are delivered to a CPU (Central Processing Unit) 28 and a RAM (Random Access Memory) 29 via an I/O (Input/Output) port 26 and a data bus 27. The CPU 28 calculates various kinds of deviation color by color and then determines correction amounts by using the deviation. A ROM (Read Only Memory) 30 stores various programs including a program for calculating amounts of deviation. It is to be noted that the CPU 28 designates the addresses of the ROM 30 and those of the RAM 29 as well as various input/output units.

Further, the CPU 28 monitors the output signal of the photosensitive element 17 at a preselected timing. A light controller 32 controls the quantity of light to issue from the light-emitting element 15, so that the sensor 19 can surely sense the register marks 18 even when, e.g., the belt 3 and light emitting element 15 are deteriorated. That is, the output signal of the photosensitive element 17 has its level maintained constant. The CPU 28 causes a write control board 33 to vary registration in the main and subscanning directions in accordance with the determined correction amounts and to vary the image frequency in accordance with a magnification error. The write control board 33 includes clock generators each being assigned to a particular color and implemented by a VCO (Voltage Controlled Oscillator) or similar device capable of extremely finely setting an output frequency. The outputs of the clock generators are used as pixel clocks.

Figure 14A:
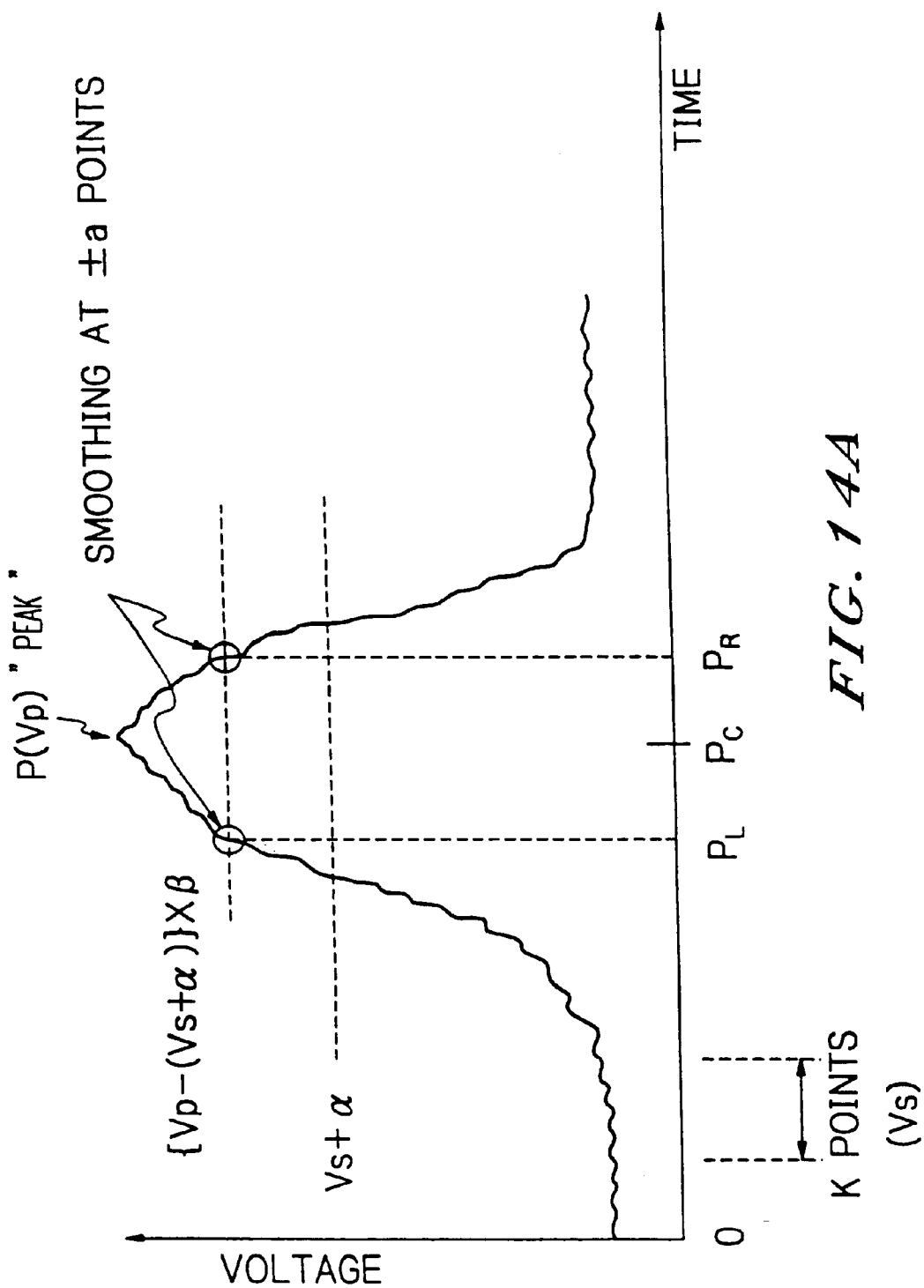
FIG. 14 is a graph showing the variation of a voltage output from one sensor when the sensor senses one register mark.
Figure 14B:
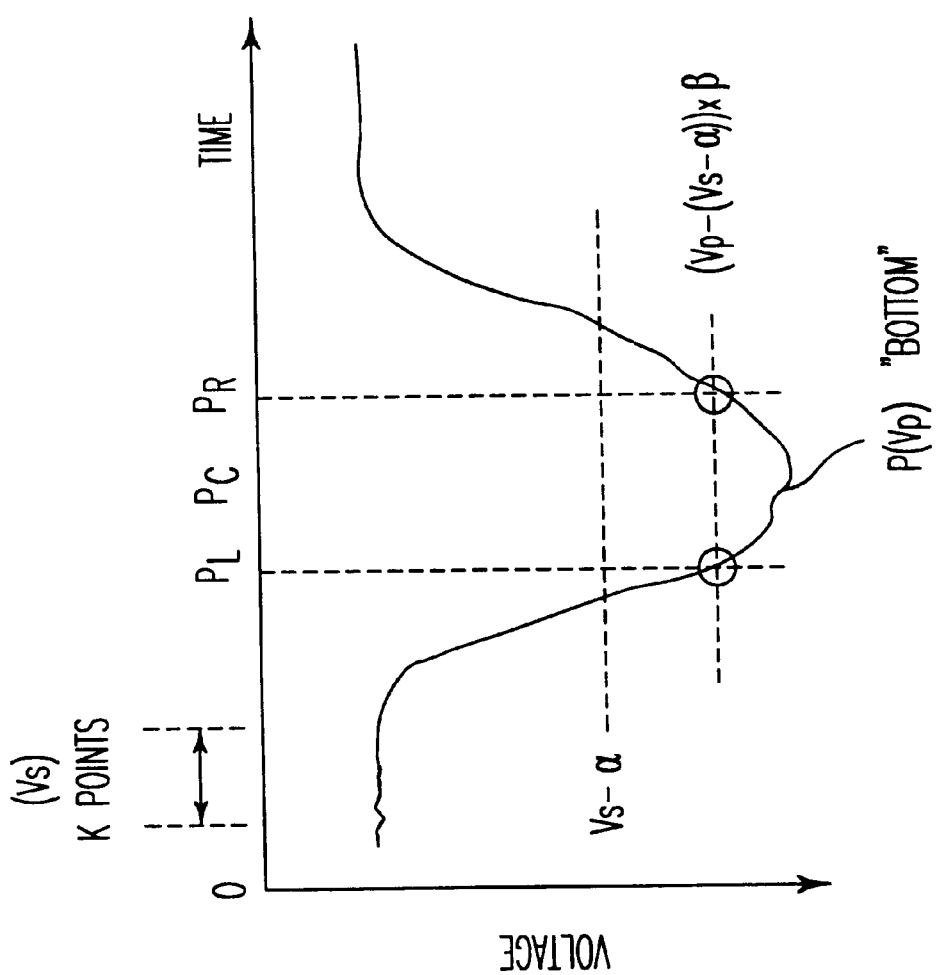

FIG. 14 is a graph showing the variation of a voltage occuring when one sensor 19 senses one line of the register marks 18, FIG. 10. As show, the voltage varies in the form of a peak or a minimum value because the sensor 19 senses both the background of the belt 3 and the register marks 18. The center point of the position information relating to the above line should preferably be used to minimize the influence of the, e.g., the blur of mark edges.

Figure 15:
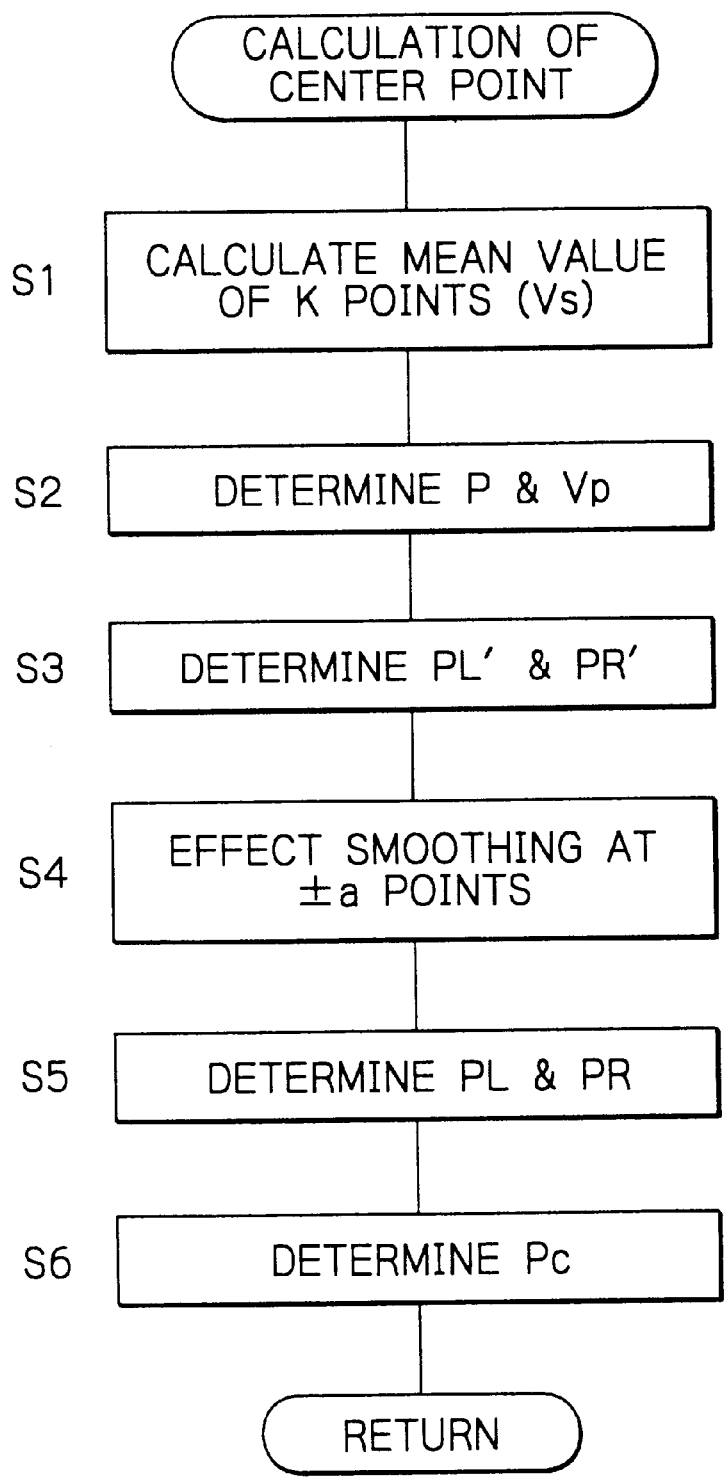
FIG. 15 is a flowchart representative of a specific procedure in which the illustrative embodiment determines the center position of the register mark by calculation.

FIG. 15 demonstrates a specific operation of the CPU 28, FIG. 13, for calculating the center point of the line of the register mark 18. As shown, the CPU 28 produces a mean value of K points in a background portion preceding the line to thereby determine the level Vs of the background (step S1). The CPU 28 then sequentially compares the subsequent data with the level Vs in order to determine a point P where a peak appears and its level Vp (step S2). As shown in FIG. 14, assume a level between the level Vp and a voltage "Vs+α" higher than Vs by a preselected level α and determined by using a preselected ratio β. Then, the CPU 28 uses such a level as a threshold level "(Vp−(Vs+α))×β". The CPU 28 determines points where the sensor output coincides with "(Vp−(Vs+α))×β" and points $P_L'$ and $P_R'$ adjoining them (step S3). Subsequently, the CPU 28 applies the method of moving averages or similar smoothing method to preselected ±a points preceding and following the above points (step S4). The CPU 28 again determines points where the sensor output coincides with "(Vp−(Vs+α))×β" and points adjoining them as two points $P_L$ and $P_R$ (step S5). Finally, the CPU 28 determines a point $P_C$ intermediate between the points $P_L$ and $P_R$ to be the center of the line (step S6). The procedure shown in FIG. 15 implements mark identifying means and center identifying means.

The above procedure successfully distinguishes the register mark 18 and the background of the belt 3 with the signal level Vs representative of the background and the peak Vp of the signal. It is therefore possible to accurately detect positional deviation between the images of different colors and correct it. Further, the threshold level selected on the basis of the two signal levels Vs and Vp allows only necessary portions of the signal waveform to be smoothed. This promotes accurate and rapid calculations for the correction of the deviation.

An alternative embodiment of the present invention will be described hereinafter. The arrangements shown in FIGS. 6 through 13 also apply to this embodiment and will not be described specifically in order to avoid redundancy.

Figure 16:
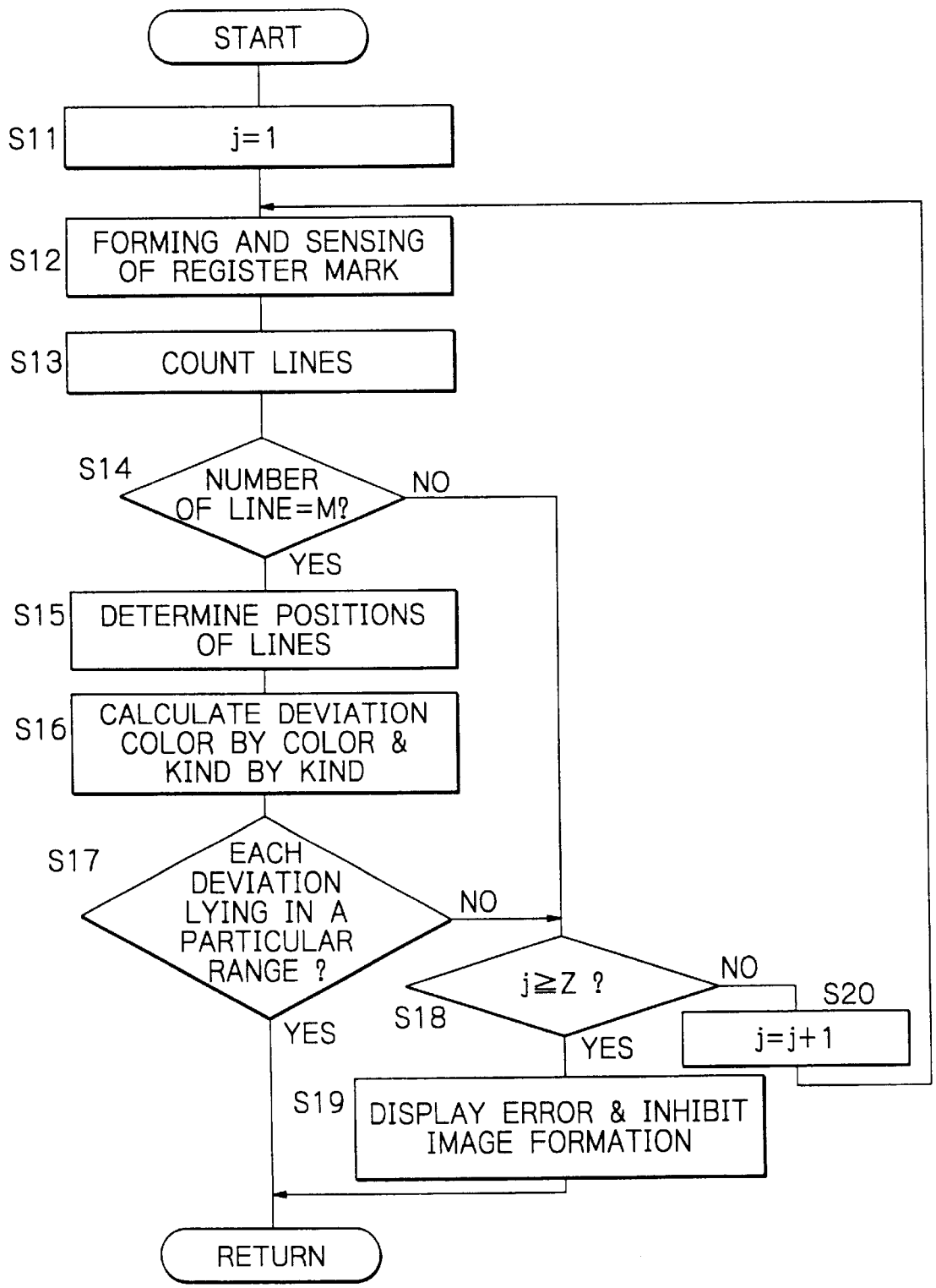
FIG. 16 is a flowchart demonstrating a specific deviation correcting procedure representative of an alternative embodiment of the present invention.

FIG. 16 shows a specific procedure for the correction of deviation particular to the illustrative embodiment. As shown, the CPU 28, FIG. 13, substitutes 1 (one) for a variable j indicative of how many times the register marks 18 have been formed and sensed, i.e., how many times the deviation has been calculated (step S11). The CPU 28 then forms and senses the register marks 18 (step S12) and counts the lines of the register marks (step S13). This implements a first counter. Subsequently, the CPU 28 determines whether or not the number of lines is m (step S14). If the answer of the step S14 is positive (Y), the CPU 28 executes a step S15; if otherwise, (N, step S14), the CPU 28 jumps to a step S18. In the step S15, the CPU 28 identifies the positions of the lines. The CPU 28 then calculates the amounts of various kinds of deviation between the images of different colors (step S16) and determines whether or the calculated amounts each lie in a particular range color by color (step S17). If the answer of the step S17 is Y, the CPU 28 returns. If the answer of the step S17 is N, the CPU 28 jumps to a step S18 for determining whether or not the variable j has reached a preselected value Z (j≧Z). If the answer of the step S18 is Y, the CPU 28 executes preselected error processing, e.g., displays an error message on a display, not shown, and inhibits the apparatus from forming an image (step S19) and then returns. This implements first error processing means. If the answer of the step S18 is N, the CPU 28 increments the variable j (step S20) and then jumps to the step S12.

Figure 17:
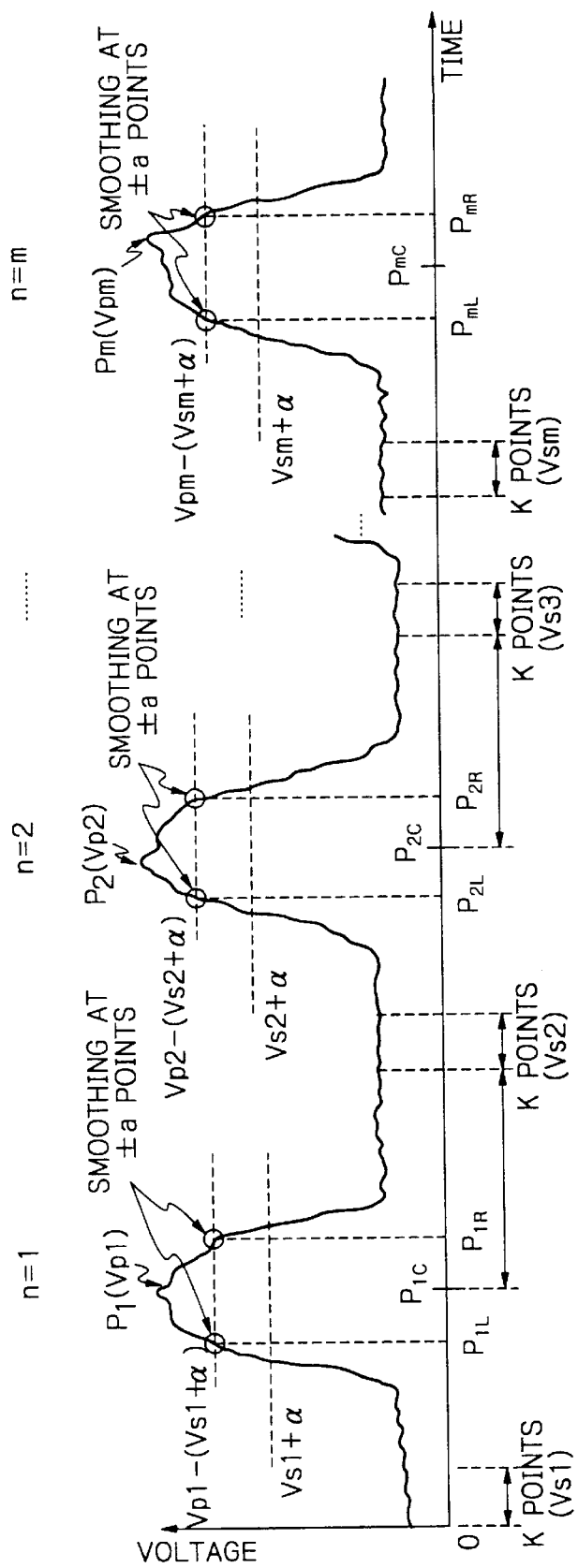
FIG. 17 is a graph showing the variation of a voltage output from one sensor when the sensor senses one register mark.

FIG. 17 shows the variation of the voltage output from one sensor 19 occurring when the sensor 19 senses one of the register marks 18, FIG. 10. As shown, the output of the sensor 19 representative of the register mark 18 has a waveform including peaks the number of which is equal the number m of horizontal lines and oblique lines. The CPU 28 determines the previously stated levels Vs and Vp line by line, i.e., Vsn and Vpn (n =1, 2, 3, . . . , m) so as to identify the consecutive lines. The CPU 28, however, may happen to determine, e.g., a smear on the background of the belt 3 to be a line. In light of this, the CPU 28 determines whether or not the number of lines, which it identified, is equal to a desired number (m in the illustrative embodiment). This is successful to determine whether or not the result of detection is correct.

Figure 18:
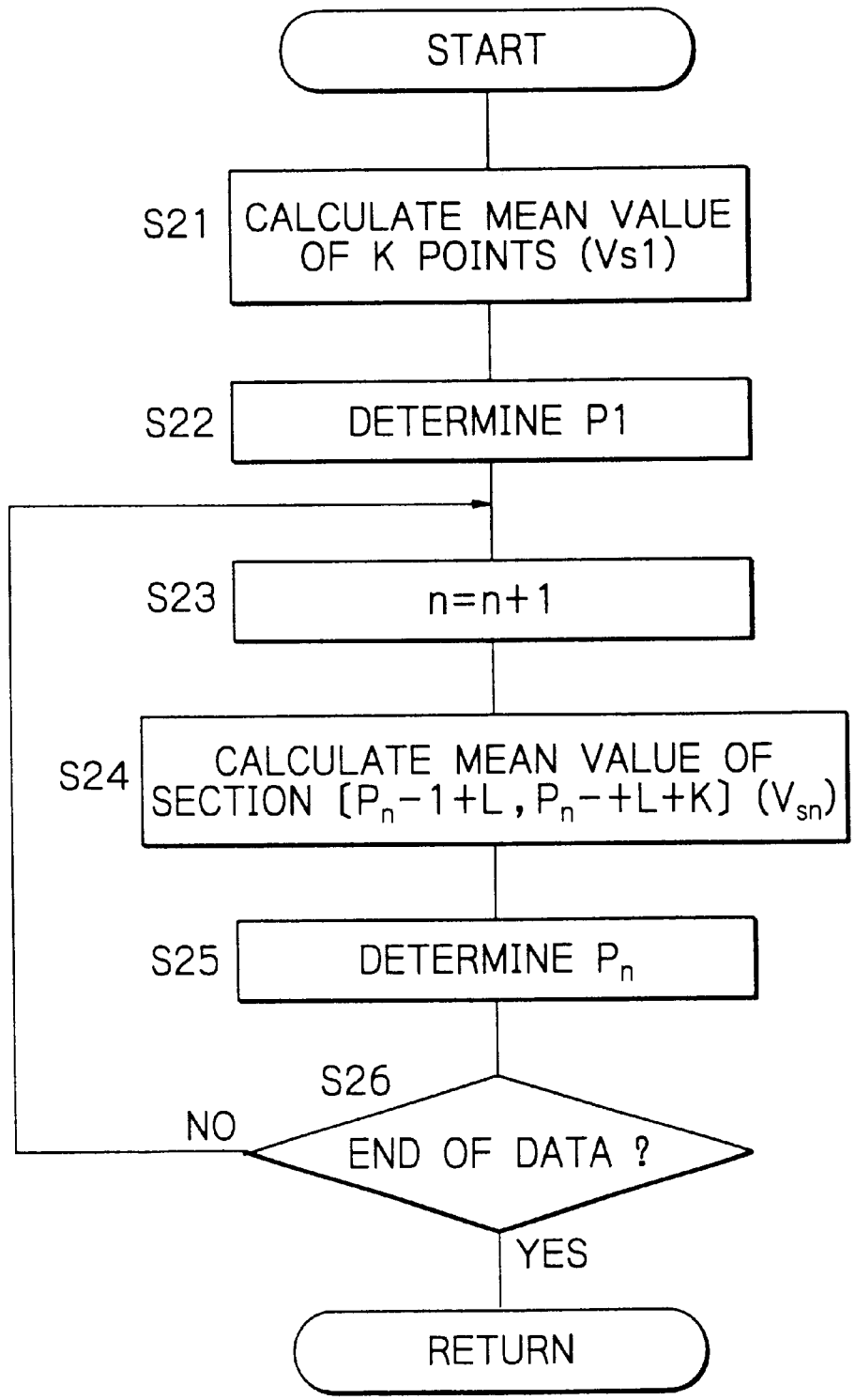
FIG. 18 is a flowchart showing a specific procedure in which the alternative embodiment counts lines.

Specifically, as shown in FIG. 18, the CPU 28 calculates a mean value of data of K consecutive points input thereto for the first time to thereby produce a level Vs1 (step S21) and then produces a peak P1 (step S22). Subsequently, the CPU 28 increments a variable n representative of the number of lines by 1 (step S23) and starts identifying the next line. The CPU 28 calculates a mean value of a section [P(n−1)+L, P(n−1)+L+K] beginning at a point which is later than P(n−1) by L points so as to produce Vsn (step S24) and then calculates Pn (step S25). Thereafter, the CPU 28 determines whether or not it has executed identification with all of the data (step S26). If the answer of the step S26 is Y, the CPU 28 returns while, if it is N, the CPU 28 jumps to the step S23. The CPU 28 returned after the step S26 determines whether or not the variable n is equal to the desired number of lines m. If n is not equal to m, the CPU 28 executes preselected error processing. For example, the CPU 28 may repeat the formation of the register marks 18, detection of the marks 18, and counting of the lines.

As stated above, in the illustrative embodiment, the CPU 28 calculates the signal level Vsn of the background of the belt 3 and peak value Vpn for each line of each register mark 18, thereby distinguishing the line from the background. Therefore, the illustrative embodiment can accurately detect positional deviation between the images of different colors and correct it. Further, the CPU 28 determines whether or not the number of lines, which it detected, is equal to the preselected number m and thereby determines whether or not the result of detection is correct. This implements easy and rapid decision on detection errors. In addition, in the event of a detection error, the CPU 28 causes the formation of the register marks 18 to be repeated all over again, further promoting the accurate detection and correction.

It is noteworthy that the CPU 28 counts the lines before it calculates the center of each line. Should the CPU 28 sequentially calculate the centers of the consecutive lines and then find that the number of detected lines is greater than the expected number at the end of the processing, a period of time taken by the CPU 28 for calculations would be simply wasted. The illustrative embodiment therefore reduces a period of time necessary for error detection as far as possible and frees the operator from uneasiness or dissatisfaction.

Another alternative embodiment of the present invention will be described hereinafter. The arrangements shown in FIGS. 6 through 13 also apply to this embodiment and will not be described specifically in order to avoid redundancy.

Figure 19:
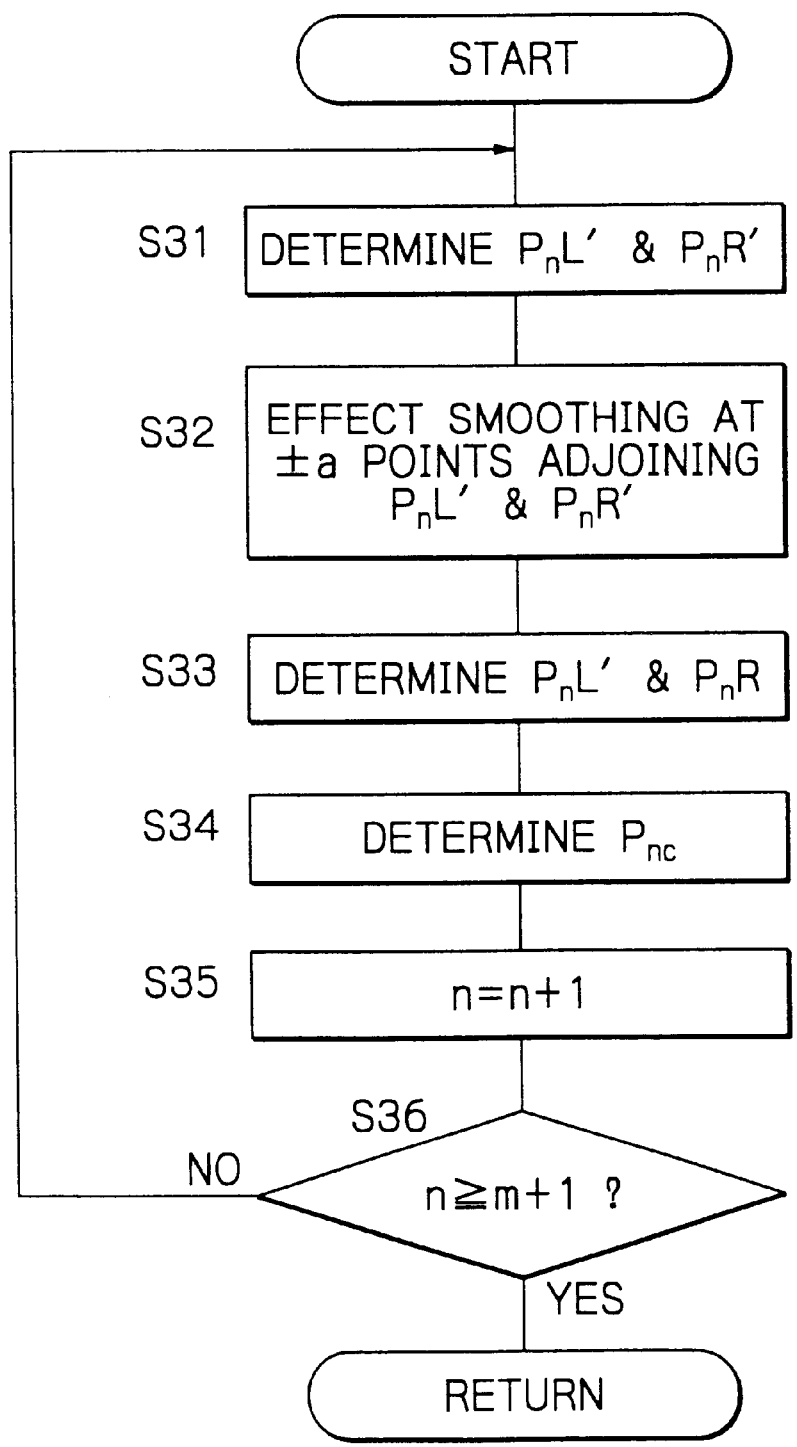
FIG. 19 is a flowchart showing a specific center position calculating procedure representative of another alternative embodiment of the present invention.

In the illustrative embodiment, the CPU 28, FIG. 13, calculates a center position with all of the lines constituting each register mark 18. The CPU 28 has already determined Vsn, Pn and Vpn of the "n" line (n=1, 2, 3, . . . , m) at the time of line counting. As shown in FIG. 19, the CPU 28 determines PnL' and PnR' (step S31), smoothes preselected ±a points preceding and following PnL' and PnR' (step S32), determines P1L and P1R (step S33), and calculates the previously stated center position Pnc (step S34). Subsequently, the CPU 28 increments the variable n representative of the number of lines (step S35) and then determines whether or not n is greater than or equal to m+1 (step S36). If the answer of the step S36 is Y, the CPU 28 returns; if otherwise (N, step S36), the CPU 28 jumps to the step S31. In this manner, the CPU 28 sequentially determines the center positions of the m consecutive lines. The CPU 28 executes the above-described processing with each of the outputs of the two sensors 19.

The CPU 28 calculates the deviation of registration in the main and subscanning directions, skew, a magnification error in the main scanning direction and so forth with respect to a reference color by using the data representative of the center points of the lines. The CPU 28 then calculates a control amount for correcting such deviation. With this procedure, it is possible to reduce the influence of, e.g., the blur of the edges of the register marks 18 and therefore to accurately detect and correct deviation between the images of different colors.

The CPU 28 may accidentally skip the decision on the number of lines despite that a detection error has occurred. In light of this, the CPU 28 of the illustrative embodiment executes additional checking after the calculation of deviations between the images of different colors. Specifically, the CPU 28 determines whether or not the amount of each deviation lies in a particular preselected range and, if the answer of this decision is positive, executes error processing, e.g., repeats the formation of the register marks 18, detection of the marks 18, and the calculation of deviations. This implements second error processing means. This further promotes the accurate detection and correction of deviation between the images.

Assume that even after the above sequence beginning with the formation of the register marks 18 and ending with the calculation of deviations has been repeated a plurality of times, the CPU 28 determines that the detection is erroneous. Then, it is likely that some trouble has occurred in the apparatus itself. The illustrative embodiment determines how many times the above procedure has been repeated in total. This implements a second counter. When the procedure is repeated more than Z times, the illustrative embodiment displays an error message meant for the operator and inhibits the apparatus from forming images. This implements third error processing means. It is therefore possible to prevent the error processing from continuing over a long period of time and making the operator to feel uneasy.

In summary, it will be seen that the present invention provides an image forming apparatus having various unprecedented advantages, as enumerated below.

(1) The apparatus distinguishes a register mark and the background of a conveying member on the basis of a level Vs of a signal representative of the background and the peak value or the bottom value Vp of the signal. The apparatus can therefore accurately detect deviation between images of different colors and correct it.

(2) The apparatus determines a threshold level on the basis of the level Vs of the signal representative of the background and the peak value or the bottom value Vp of the signal, and smoothes only necessary portions of the signal waveform. The apparatus can therefore accurately detect deviation between images of different colors and correct it while enhancing accurate and rapid calculations.

(3) The apparatus distinguishes each line of the register mark and the background around it on the basis of a level Vsn of the signal representative of the background and the peak value or the bottom value Vpn of the signal. The apparatus can therefore accurately detect deviation between images of different colors and correct it.

(4) The apparatus determines whether or not the result of detection is correct by determining whether or not part of the mark detected coincides with a preselected number. This implements easy decision on a detection error and reduces a period of time necessary for the decision.

(5) In the event of erroneous detection, the apparatus repeats a sequence beginning with the formation of register marks all over again and can therefore accurately detect deviation between images of different colors and correct it.

(6) The apparatus executes the decision on a detection error before determining the center position of each line. This also implements easy decision on a detection error and reduces a period of time necessary for the decision.

(7) The apparatus determines, line by line, the threshold level on the basis of the level Vsn of the signal representative of the background and the peak value or the bottom value Vpn of the signal, and smoothes only necessary portions of the signal waveform. This is also successful to accurately detect deviation between images of different colors and correct it while enhancing accurate and rapid calculations.

(8) The apparatus calculates and corrects deviation between the images of different colors on the basis of the center positions of the consecutive lines. This is also successful to accurately detect deviation between images of different colors and correct it.

(9) The apparatus checks the deviation produced by calculations and can therefore accurately detect deviation between images of different colors and correct it.

(10) When the apparatus repeats the error processing a preselected number of times, it stops executing the error processing, determining that some trouble has occurred therein.

(11) The apparatus displays an error message and stops forming images to thereby free the operator from uneasiness or dissatisfaction.

The present document incorporates by reference the entire contents of Japanese priority document, JP 11-133,706, filed in Japan on May 14, 1999.

Various modifications will become possible for those skilled in the art after receiving the teachings of the present disclosure without departing from the scope thereof.

What is claimed is:

1. A color image forming apparatus comprising:

a conveying member for conveying a recording medium in a preselected direction;

a plurality of image forming sections arranged side by side along said conveying member, each image forming section forming a toner image of a particular color by an electrophotographic process;

a plurality of image transfer units respectively assigned to said plurality of image forming sections for sequentially transferring toner images to the recording medium one upon another;

mark forming means for causing said plurality of image forming sections to form respective register marks with toner and transferring said register marks to the recording medium, whereby deviations in a position of said register marks allows deviations of the toner images on said recording medium to be detected;

mark sensing means for sensing the position of the register marks;

correcting means for correcting the deviations of the toner images on said recording medium on the basis of a signal output from said mark sensing means, including, mark identifying means for specifying from said signal output from said mark sensing means a background level Vs of said conveying member, and determining a point on said signal in excess of a first level $Vs+\alpha$ or $Vs-\alpha$, where $\alpha$ denotes a preselected value, having a peak or a bottom value Vp, respectively, within a preselected section of said signal where a part of the register marks has been sensed, center identifying means for determining a first pair of points coinciding with a second level $(Vp-(Vs+\alpha))\times\beta$ or $(Vp-(Vs-\alpha))\times\beta$, where $\beta$ denotes a preselected ratio, said second level lying between the peak or the bottom value Vp and the first level $Vs+\alpha$ or $Vs-\alpha$, executing smoothing of said signal to produce a smoothed signal about the first pair of points or about points in proximity to said first pair points, redetermining using the smoothed signal a second pair of points at said second level $(Vp-(Vs+\alpha))\times\beta$ or $(Vp-(Vs-\alpha))\times\beta$, or a third pair of points in proximity to said second pair of points, and determining a center point between said second or third pair of points to be a center position of one of the register marks, deviation calculation means for calculating the deviation of the register marks based on said center position, and write control means for adjusting a timing of a transfer of the toner image in such a manner as to correct for said deviation.

2. An apparatus as claimed in claim 1, wherein said mark identifying means specifies a plurality of background levels Vsn of said conveying member, and determines a plurality of points on said signal above a level $Vsn+\alpha$ ($n=1, 2, 3, \ldots, m$) or $Vsn-\alpha$, where $\alpha$ denotes a preselected value, each point in said plurality has a peak or a bottom value Vpn within a preselected section where one of the register marks has been sensed.

3. An apparatus as claimed in claim 2, further comprising:

a first counter incremented every time said mark identifying means identifies a part of the register mark; and first error processing means for executing, before said center identifying means identifies the center position, preselected error processing if a count of said first counter is different from a preselected number when the register mark is detected with an entire signal output form said mark sensing means.

4. An apparatus as claimed in claim 3, wherein the preselected error processing causes said mark forming means to again form the register marks and causes said mark identifying means to again identify said register marks.

5. An apparatus as claimed in claim 1, wherein, when the peak or the bottom value Vp and the background level Vs respectively have a plurality of values Vpn and a plurality of values Vsn ($n=1, 2, 3, \ldots, m$), said apparatus further comprises:

plural center identifying means for determining a first set of points between Vpn and $Vsn+\alpha$ or $Vsn-\alpha$ coinciding with a set of third levels $(Vpn-(Vsn+\alpha))\times\beta$ or $(Vpn-(Vpn-\alpha))\times\beta$, where $\beta$ denotes a preselected ratio, executing preselected smoothing of said signal about said first set of points or about points in proximity to said first set of points to produce a set of smoothed signals, redetermining using the set of smoothed signals a second set of points coinciding with said level $(Vpn-(Vsn+\alpha))\times\beta$ or $(Vpn-(Vsn-\alpha))\times\beta$ or a third set of points in proximity to said second set of points, and determining a plurality of center points between said second or third set of points to be center positions of the register marks.

6. An apparatus as claimed in claim 5, further comprising:

second error processing means for executing preselected error processing when the deviation determined by said correcting means does not lie in a preselected range.

7. An apparatus as claimed in claim 6, wherein said first error processing means causes said mark forming means to again form the register mark and causes said mark identifying means to again identify said register mark.

8. An apparatus as claimed in claim 6, further comprising:

a second counter for determining how many times said first error processing means or said second error processing means has executed the error processing; and third error processing means for executing preselected error processing when a count of said second counter reaches a preselected count.

9. An apparatus as claimed in claim 8, wherein said second error processing means displays an error message and inhibits said apparatus from forming a color image.

10. A color image forming apparatus comprising:

a conveying member configured to convey a recording medium in a preselected direction;

a plurality of image forming sections arranged side by side along said conveying member, each image forming section configured to form a toner image of a particular color by an electrophotographic process;

a plurality of image transfer units respectively assigned to said plurality of image forming sections and configured to sequentially transfer toner images to the recording medium one upon another;

a mark forming device configured to cause said plurality of image forming sections to form respective register marks with toner and to transfer said register marks to the recording medium, said register marks allowing deviations of the toner images on said recording medium to be detected;

a mark sensor configured to sense the register marks;

a correcting device configured to correct the deviations of the toner images on said recording medium on the basis of a signal output from said mark sensor, including, a mark identifying device configured to specify from said signal output from said mark sensor a background level Vs of said conveying member, and to determine a point on said signal in excess of a value Vs+α or Vs−α, where α denotes a preselected value, having a peak or a bottom value Vp, respectively, within a preselected section of said signal where a part of the register marks has been sensed, a center identifying device configured to determine a first pair of points coinciding with a second level $(Vp-(Vs+\alpha))\times\beta$ or $(Vp-(Vs-\alpha))\times\beta$, where $\beta$ denotes a preselected ratio, said second level lying between the peak or the bottom value Vp and the first level Vs+α or Vs−α, to execute smoothing of said signal to produce a smoothed signal about the first pair of points or about points in proximity to said first pair points, to redetermine using the smoothed signal a second pair of points at said second level $(Vp-(Vs+\alpha))\times\beta$ or $(Vp-(Vs-\alpha))\times\beta$, or a third pair of points in proximity to said second pair of points, and to determine a center point between said second or third pair of points to be a center position of one of the register marks, a deviation calculation device to calculate the deviation of the register marks based on said center position, and a write control device configured to adjust a timing of a transfer of the toner image in such a manner as to correct for said deviation.

11. An apparatus as claimed in claim 10, wherein said mark identifying device specifies a plurality of background levels Vsn of said conveying member, and determines a plurality of points on said signal above a level Vsn+α (n =1, 2, 3, . . . , m) or Vsn−α, where α denotes a preselected value, each point in said plurality has a peak or a bottom value Vpn within a preselected section where one of the register marks has been sensed.

12. An apparatus as claimed in claim 11, further comprising:

a first counter incremented every time said mark identifying device identifies a part of the register mark; and a first error processing device configured to execute, before said center identifying device identifies the center position, preselected error processing if a count of said first counter is different from a preselected number when the register mark is detected with an entire signal output form said mark sensor.

13. An apparatus as claimed in claim 12, wherein the preselected error processing causes said mark forming device to again form the register mark and causes said mark identifying device to again identify said register mark.

14. An apparatus as claimed in claim 10, wherein, when the peak or the bottom value Vp and the background level Vs respectively have a plurality of values Vpn and a plurality of values Vsn (n=1, 2, 3, . . . , m), said apparatus further comprises:

a plural center identifying device configured to determine a first set of points between Vpn and Vsn+α or Vsn−α coinciding with a set of third levels $(Vpn-(Vsn+\alpha))\times\beta$ or $(Vpn-(Vsn-\alpha))\times\beta$, where $\beta$ denotes a preselected ratio, executing preselected smoothing of said signal about said first set of points or about points in proximity to said first set of points to produce a set of smoothed signals, redetermining using the set of smoothed signals a second set of points coinciding with said level $(Vpn-(Vsn+\alpha))\times\beta$ or $(Vpn-(Vsn-\alpha))\times\beta$ or a third set of points in proximity to said second set of points, and determining a plurality of center points between said second or third set of points to be center positions of the register marks.

15. An apparatus as claimed in claim 14, further comprising:

a second error processing device configured to execute preselected error processing when the deviation determined by said correcting device does not lie in a preselected range.

16. An apparatus as claimed in claim 15, wherein said first error processing device causes said mark forming device to again form the register mark and causes said mark identifying device to again identifying said said register mark.

17. An apparatus as claimed in claim 15, further comprising:

a second counter configured to determine how many times said first error processing device or said second error processing device has executed the error processing; and a third error processing device configured to execute preselected error processing when a count of said second counter reaches a preselected count.

18. An apparatus as claimed in claim 17, wherein said second error processing device displays an error message and inhibits said apparatus from forming a color image.

* * * * *